US009535416B2

(12) United States Patent
Ekelund et al.

(10) Patent No.: US 9,535,416 B2
(45) Date of Patent: Jan. 3, 2017

(54) ROBOT TEACH PENDANT UNIT

(75) Inventors: Anders O. Ekelund, Göteborg (SE);
Steve Murphy, Hovås (SE)

(73) Assignee: ABB Technology Ltd, Zurich (CH)

( * ) Notice: Subject to any disclaimer, the term of this patent is extended or adjusted under 35 U.S.C. 154(b) by 1179 days.

(21) Appl. No.: 13/119,435

(22) PCT Filed: Oct. 21, 2009

(86) PCT No.: PCT/EP2009/063770
§ 371 (c)(1),
(2), (4) Date: Mar. 17, 2011

(87) PCT Pub. No.: WO2010/046374
PCT Pub. Date: Apr. 29, 2010

(65) Prior Publication Data
US 2011/0190938 A1 Aug. 4, 2011

(30) Foreign Application Priority Data
Oct. 21, 2008 (WO) ............... PCT/EP2008/064213

(51) Int. Cl.
*G05B 19/409* (2006.01)
(52) U.S. Cl.
CPC ... *G05B 19/409* (2013.01); *G05B 2219/36162* (2013.01); *G05B 2219/39443* (2013.01); *G05B 2219/40099* (2013.01)
(58) Field of Classification Search
USPC ........................................................ 345/418
See application file for complete search history.

(56) References Cited

U.S. PATENT DOCUMENTS 6,157,933 A * 12/2000 Celi et al. .................. 715/234
6,560,513 B2 * 5/2003 Krause et al. .............. 700/264
(Continued)

FOREIGN PATENT DOCUMENTS

JP       2003 053688 A     2/2003
WO    WO 2010/046374 A1   4/2010

OTHER PUBLICATIONS

Wright, William, et al. "The Sandbox for analysis: concepts and methods." Proceedings of the SIGCHI conference on Human Factors in computing systems. ACM, 2006.*
(Continued)

*Primary Examiner* — Barry Drennan
*Assistant Examiner* — Richard M Russell
(74) *Attorney, Agent, or Firm* — Seppo Laine Oy

(57) ABSTRACT

The present invention relates to a robot teach pendant unit (2) coupled to a programmable robot controller (1), the teach pendant comprising a graphical screen (6), and a native user interface program (9) which creates a graphical user interface and displays the user interface on the graphical screen. The robot teach pendant further comprises a processing component (10) capable of receiving an application including one or more animated graphical objects, instructions for displaying the animated objects on the graphical screen, information on the behavior of the animated graphical objects, and instructions on how the user can interact with the animated graphical objects, and the processing component is configured to display the animated graphical objects on the screen and to set up a sandbox providing an isolation mechanism for safely running the application without disturbing the execution of normal teach pendant operations, and said user interface program is programmed to host directly the processing component and instructing it to load (Continued)

and display the application containing the animated graphical objects.

10 Claims, 1 Drawing Sheet

(56) References Cited

U.S. PATENT DOCUMENTS

| | | | |
|---|---|---|---|
| 7,506,020 B2 * | 3/2009 | Ellis | 709/201 |
| 2008/0025387 A1 * | 1/2008 | Lim et al. | 375/240.01 |
| 2008/0091301 A1 * | 4/2008 | Brantmark et al. | 700/245 |
| 2008/0307341 A1 * | 12/2008 | Ferry et al. | 715/764 |

OTHER PUBLICATIONS

Zaeh, M., and W. Vogl. "Interactive laser-projection for programming industrial robots." Proceedings of the 5th IEEE and ACM International Symposium on Mixed and Augmented Reality. IEEE Computer Society, 2006.*

Written opinion of the ISA for PCT/EP2009/063770 Dec. 2009.

* cited by examiner

ROBOT TEACH PENDANT UNIT

FIELD OF THE INVENTION

The present invention relates generally to a robot system comprising a programmable robot controller and a teach pendant in communication with the robot controller, and more particularly to a robot teach pendant in communication with a robot controller.

PRIOR ART

An industrial robot is programmed to carry out work along an operating path. In order to program the robot the path, the robot is manipulated to positions along the desired operating path. These positions are stored as instructions in a memory in the robot controller. During operation of the robot, the program instructions are executed, thereby making the robot work as desired.

When the robot is operating in manual mode, the robot is controlled by means of a portable operator control device, generally denoted a Teach Pendant Unit (TPU), and called hereafter teach pendant. The teach pendant includes a graphical screen, a CPU, an operating system (OS) running on the CPU, and a user interface program running on the OS and CPU. The user interface program is adapted to create a graphical user interface and to display the user interface on the graphical screen. The user interface program is specially crafted so that it can host additional components, such as a web browser.

A robot operator uses a teach pendant for manually controlling the robot, for example to program the robot to follow an operating path. The teach pendant may also be used for monitoring a robot program, changing certain variables in the program, input process parameters, starting, stopping and editing the program. A teach pendant normally comprises operator control means, for example a joystick, a ball, a set of buttons or any combination thereof, a visual display unit, and safety equipment including an enabling device and an emergency stop button. A wide variety of data is displayed on the teach pendant unit to provide necessary and important information for the operator. The teach pendant user interaction has changed a lot over the years in response to increased demand for information presentation, for example there is a desire to present a lot of information in one view. When the robot is operating in automatic mode, there is also a need to continually display status and information to the operator and for the operator to tune and adjust the robot operation. A robot controller, however, is tasked with moving physical equipment and handling Input-Outputs. This means that the controller does not necessarily have the CPU power available to maintain a high level interaction with the teach pendant while moving the robot.

U.S. Pat. No. 6,560,513 discloses a teach pendant unit including a web browser. The web browser is running on the teach pendant. The web browser receives images, data and information on how that data and images are to be presented on the screen, from the robot controller. A disadvantage with the web browser is that the images and data presented on the screen are static and this is fundamental to the design of the protocols used by web browsers to get pages. Web browsers are designed to present documents and not designed to present interactive applications. A lot of extra work is necessary to make a page in a web browser update dynamically due to changes in the controller. The interactive model in a web page is difficult to work with and great development effort is spent to provide the rich user interaction that can be found with conventionally coded interfaces. One solution to this problem is to run more scripts in the web browser such as in the Asynchronous JavaScript and XML (AJAX) model. The problem with this solution is that scripts require server communications and responses and in the case of a robot teach pendant, the server is the robot controller which has real-time tasks of moving the robot. Another known solution to the problems of interactivity and client-server communications is to host an additional component in the web browser which can provide a higher level of interactivity, such as an ActiveX control. The problem is that one does not want to build a unique ActiveX control for every user interface and dialog and they still are hosted inside a web browser. The need is to have a control which can be easily customized yet provide a richer user experience than a simple web page While a web browser can be used to host an additional component such as an ActiveX component, there is a added cost in overhead for memory and CPU usage. A robot teach pendant is a limited device with limited memory and processing power. Some teach pendants may be used in environments with easily inflammable gases, such as paint booths, where memory and CPU must be limited to reduce the explosion risk. Thus a web browser is inefficient. By itself, the web browser does not have an easy and efficient mechanism for running an application including animated images which allow interaction with the user.

In addition, robots and their teach pendants are used in a variety of industrial applications where there is a need for customizing the user interface and interactions with the user. This means that the manufacturers of the teach pendant may not be the users that do the customization. Thus there is a need to be able to load rich end-user applications into the teach pendant. With this need comes the requirement for stability and security. A additional application loaded onto the teach pendant shall not be allowed to crash the entire teach pendant. The application may also need to be run in a restricted environment where it cannot impact the rest of the teach pendant, other applications, and connected robot or other devices without proper checks and control.

OBJECTS AND SUMMARY OF THE INVENTION

The object of the present invention is to address the above needs of providing good user interaction with presentation of images and data with the restrictions on the limited memory and CPU power of a robot teach pendant with the necessary security.

This object is achieved by a teach pendant unit as defined in claim 1.

Such a teach pendant comprises: a graphical screen, a native user interface program configured to create a graphical user interface and to display the user interface on the graphical screen, and a processing component capable of receiving an application including one or more animated graphical objects, instructions for displaying the animated objects on the graphical screen, information on the behavior of the animated graphical objects, and instructions on how the user can interact with the animated graphical objects. The processing component is configured to display the animated graphical objects on the screen and to set up a sandbox providing an isolation mechanism for safely running the application without disturbing the execution of normal teach pendant operations, and said user interface program is configured to host the processing component and to instruct the processing component to load and display the application containing the animated graphical objects.

The native user interface program is the base program that is provided with the teach pendant for running the robot and programming. The native user interface program is not a web browser, but the normal user interface that comes with the robot teach pendant. The addition of the processing component, allows for the display of one or more animated graphical objects.

According to the invention, the processing component that is hosted in the native user interface program is provided with the ability to receive, not only data and information on how to display the data, but also animated graphical objects and information on the behavior of the animated graphical objects on the screen, for example, user-interaction behavior. The processing component, is, for example, Silverlight or Flash. The invention makes it possible to display animated graphical objects on the screen of the teach pendant and allows a user to interact with the displayed graphical objects, without excess communication with and load on the robot controller and without using a web-browser. Since the native user interface program is programmed to directly host the processing component, no web browser is needed.

When the graphical objects are loaded onto the teach pendant it is important that the basic functionality of the teach pendant is not compromised if the loaded object and behavior misbehave. According to the invention, the processing component is configured to set up a sandbox providing an isolation mechanism for safely running the application without disturbing the execution of normal teach pendant operations. The processing component implements the security boundary where the application is isolated and can only communicate under controlled circumstances. Preferably, the processing component is capable of receiving a plurality of applications and the processing component is configured to set up one sandbox for each application. A sandbox is a commercially available security mechanism for safely running programs. Due to the sandbox, it is not possible for loaded graphical objects to crash or otherwise damage the normal teach pendant behavior. Sandboxing means isolating an application and includes restrictions on what the application can do in its environment. Typically this means that restrictions are placed on the application when communicating with the teach pendant host, when accessing local storage on the teach pendant, and when communicating to the robot controller or other computer over a communications network.

Graphical objects are logically defined items to be display on the graphical screen. A graphical object can be a single pixel, or picture, letter, groups of letters, or drawings, such as squares, circles, etc. The graphical object may be a button, a dial gauge, sliders, etc. A plurality of graphical objects can be treated as a unit. Typical methods for describing these objects are XAML or BAML. The graphical objects and instructions on how to handle the interaction with these objects are included in the application and loaded to the teach pendant when the application is loaded. Graphical objects may be many small pictures working together, for example, a motor and its component parts can be represented as many small pictures that 'explode' when pressed to animate the sequence that they are removed during service.

As the robot controller is handling the robot motion, extensive communication between the teach pendant and the robot controller to move graphical object and interactions with the user must be avoided. In order to reduce the traffic between the teach pendant unit and the robot controller, the graphical objects according to the present invention are made autonomous by running in the processing component. The behaviors of the graphical objects are predefined in terms of what and when things are displayed and animated with regard to user inputs. The autonomy is achieved by the fact that each of the graphical objects includes instructions for how the object is to be displayed, information on the behavior of the graphical object on the screen, and information on how the user can interact with the graphical object, and this information is loaded to the teach pendant in the application, and further by the fact that the processing component is run on the processor of the teach pendant.

The processing component is capable of loading said application from the robot controller and/or from an external computer over a communications network. Suitably, the processing component is capable of loading the application in a compressed format and the teach pendant unit provides the capability to uncompress the application. Due to the limited memory of the teach pendant unit, it is advantageous to store the applications and graphical objects on the robot controller or other computers providing application storage but available over a communications network. In order to further reduce the traffic between the teach pendant unit and the robot controller, applications, including the graphical objects, descriptions, and code, are preferably stored in a compressed archive format, such as a ZIP format, and the application is transferred to the teach pendant in the compressed format.

According to an embodiment of the invention, the processing component is capable of loading further graphical objects from the robot controller, or from an external computer, in response to a request from the application. The advantages are that the application can load dynamic data, can load another application on demand, and delay loading objects and data to improve response time and reduce immediate memory requirements.

According to an embodiment of the invention, the processing component contains support for handling vector graphics of the application. Vector graphics is the use of geometrical primitives, such as point, lines, and curves, which are based upon mathematical equations, to represent images in computer graphic. Vector graphics allows the processing of graphical objects on the screen in a fundamentally different way, compared to bitmap graphics, which are used in today's teach pendant units. Vector graphic enables scalability where all graphics can be scaled upwards and downwards without having to store graphical objects such as images and icons in different pixel representations. This provides a great increase in efficiency of coding and representation, where an object can be resized and moved on the screen without prior coding effort. A graphical view of the robot can take up the full screen when needed and then be resized to a small window without the need for different size representations for all of the graphics in the screen.

According to an embodiment of the invention, the processing component is configured to load and execute a base application configured to display a set of interactive graphical objects representing selectable applications on the graphical screen, and upon receiving a user selection to load the selected application from the robot controller. This embodiment makes it possible for the user to select an application from a menu of alternative applications, and the selected application is loaded, for example, from the controller to the teach pendant. However, once an application has been selected and loaded to the teach pendant unit, the application can be stored on the teach pendant. Thus, it does not have to be reloaded the second time it is selected, and accordingly the traffic between the teach pendant unit and the controller is reduced.

The teach pendant unit comprises an operating system that is capable of providing base services for the graphical screen, input devices, hardware and file system of the teach pendant unit. According to an embodiment of the invention, the processing component is configured to automatically start execution of the base application upon start of the operating system of the teach pendant unit. This means that no user interaction is required to start up the base application.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
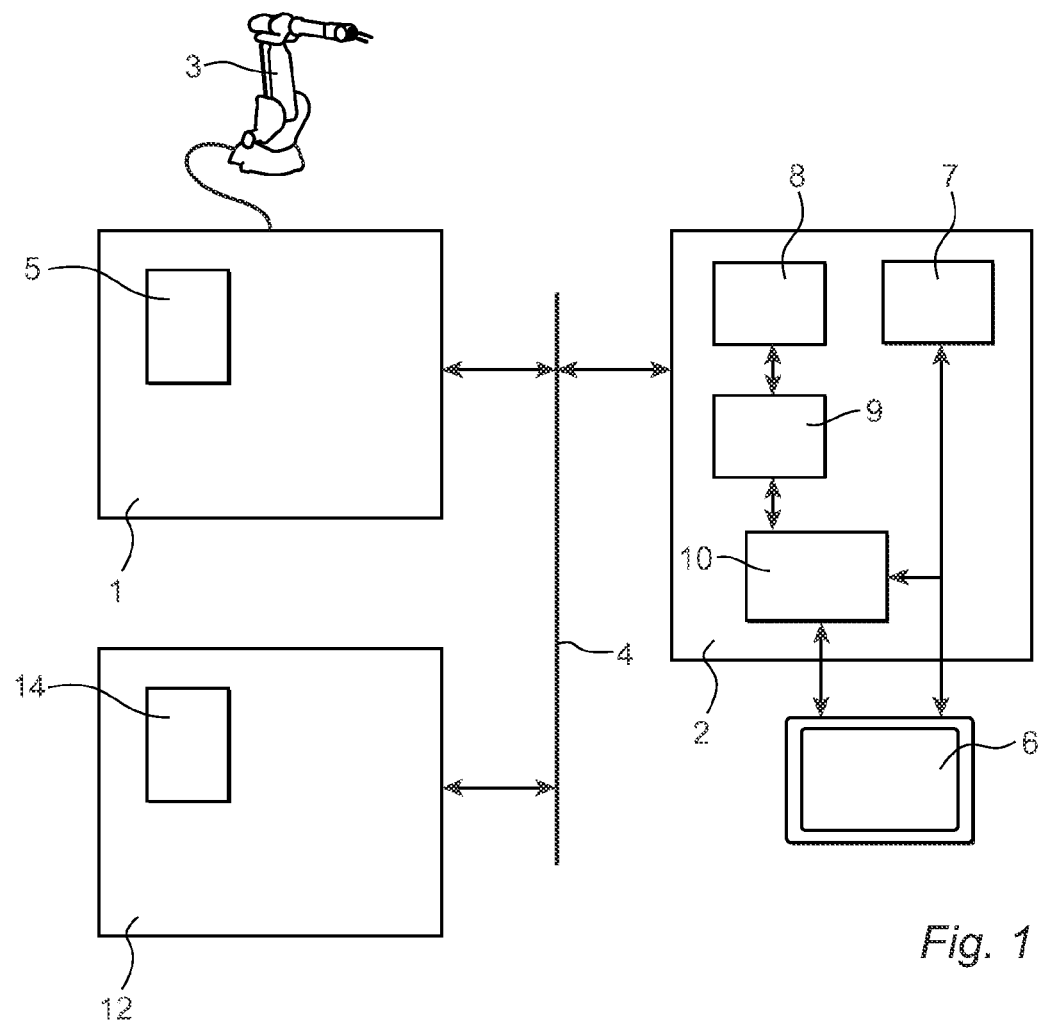
FIG. 1 shows a robot system including a teach pendant unit according to an embodiment of the invention.

FIG. 1 shows an industrial robot system comprising a programmable robot controller 1, a teach pendant unit 2 in communication with the robot controller, and a movable mechanical unit 3, also denoted a robot. The teach pendant is either physically connected (wired) to the controller or logically connected (wireless) to the controller. In the disclose embodiment the robot controller and the teach pendant unit communicates via a communication network 4. The teach pendant 2 comprises input devices (not shown), such as buttons and a joystick, safety equipment (not shown) including an enabling device and an emergency stop button, and a graphical screen 6. The graphical screen may be, for example a touch screen, or a normal color display. Input to the teach pendant and application can be via the buttons on the teach pendant, or via the touch screen. Other input mechanisms include, but are not limited to, mice, rolling buttons, and light pens.

The robot controller 1 is a traditional robot controller including hardware and software for performing normal robot controller functions such as data processing, path planning, and communication with external units. The robot controller further comprises data storage 5 for storing a plurality of applications including graphical objects, instructions for driving graphics, and information on how a user can interact with the graphical objects. The instructions for driving graph include instructions for displaying the objects on a graphical screen, and information on the behavior of the graphical objects. The data storage 5 includes a plurality of applications including graphical objects and may also include a plurality of single graphical objects.

The teach pendant 2 has the ability to send commands to the robot controller to cause the robot to move and to stop the robot execution as a single-point-of-control. The fundamental feature of the teach pendant is the ability to jog the robot via operator control means, such as a joystick, physical buttons, or virtual buttons. The teach pendant 2 further comprises a processor 7, such as a central processing unit (CPU), for operating the teach pendant unit. The processor 7 is coupled to the graphical screen 6. The teach pendant 2 further comprises an operating system 8 that is capable of providing the base services for the graphical screen 6, the input devices, and hardware and file system of the teach pendant unit. The teach pendant includes a native user interface program 9 configured to create a graphical user interface and to display the user interface on the graphical screen. The native user interface program is a program module configured to control what is displayed on the graphical screen and how it is displayed. The native user interface program 9 is provided by the robot manufacture and is included in the teach pendant upon delivery of the teach pendant.

On top of the operating system a processing component 10 is placed which is capable of downloading the applications from the robot controller. The user interface program 9 is configured to host the processing component 10 and to instruct the processing component to load and display applications containing one or more animated graphical objects. The user interface program is specially crafted so that it can host an additional processing component, such as Silverlight or Flash.

The processing component 10 and user interface program 9 is run on the processor 7 of the teach pendant. In this embodiment of the invention, the processing component is also capable of loading applications from an external computer 12 over the communication network 4. The external computer comprises data storage 14 for storing a plurality of applications including graphical objects, instructions for driving graphics, and information on how a user can interact with the graphical objects.

Preferably, the teach pendant unit is implemented with vector graphics. For example, the teach pendant contains hardware that is capable of displaying vector graphics and/or the processing component contains support for handling vector graphics of the application.

With the term driving graphics is meant that, when the instructions of the application is executed by the processing component running on the teach pendant, one ore more graphical objects are displayed on the screen, and the object is animated or changed given the instructions for user interaction. For example, the graphic object may be a soft button displayed on a touch screen. The instructions for that object are written so that when the user presses the button, the button shall animate downward two pixels change to a darker color and wait until the touch is released, and then animate upwards and lighten the color. All this is run on the teach pendant and does not involve any more communications with the main processor of the robot controller. Thus the graphics are 'driven' from the processor of the teach pendant.

In this embodiment, the robot controller as well as the external computer comprises data storage for storing application and the processing component is capable of downloading applications from the robot controller as well as the external computer. In another embodiment the applications can be stored on either the robot controller or on the external computer, and the processing component is configured to downloading applications from either the robot controller or the external computer. In order to reduce the communication load between the teach pendant and the robot controller, the applications, including the graphical objects, descriptions, and code, are stored in a compressed archive format, such as ZIP format. The processing component is configured to receive the applications in the compressed format and to uncompress the application before storing the application on the teach pendant unit. The compressed file may include a file or a multiple file archive.

Preferably, the processing component is configured to load an application to the teach pendant unit when execution of the processing component is started. The application includes some graphical objects when it is received. However, some applications may need more graphical objects later when it is run on the processor of the teach pendant unit. Therefore the processing component is capable of loading further graphical objects from the robot controller, or from the external computer in response to a request from the application. Thus, the processing component is capable of loading applications as well as graphical objects from the robot controller or the external computer.

The processing component provides an isolation mechanism, often called a sandbox, providing a mechanism for safely running the processing component without disturbing the execution of normal teach pendant operations. The processing component acts as a sandbox providing a mechanism for safely running the processing component without disturbing the execution of normal teach pendant operations. Sandboxing includes restrictions on what the application can do in its environment. This includes, but is not limited to restrictions on the application's communication with the teach pendant host, restrictions on the use of local storage on the teach pendant, and restrictions on the network communications allowed to and from the application. The processing component is configured to provide a sandbox isolation area upon loading the user selected application.

Figure 2:
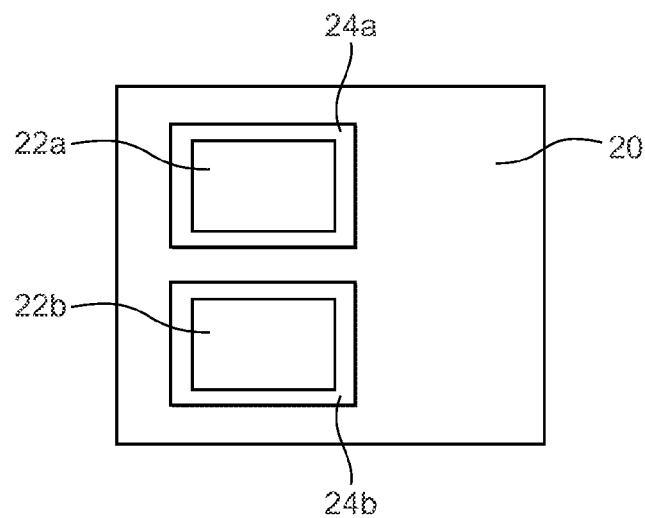
FIG. 2 shows an example of a teach pendant unit which has loaded two applications, each application being enclosed by an insulating sandbox.

The processing component is capable of receiving and storing more than one application, and the processing component is configured to set up one sandbox for each application. FIG. 2 shows an example of a teach pendant unit 20, which has loaded two applications 22a-b, each application being enclosed by an insulating sandbox 24a-b. The normal case of sandboxing is by using a virtual runtime engine, which may be in the operating system, or on-top of the operating system, e.g. Silverlight or Flash.

In one embodiment of the invention, a base application including a set of interactive graphical objects representing selectable applications is stored in the data storage of the robot controller or the external computer. The processing component is, for example, configured to automatically load and start execution of the base application upon start of the operating system of the teach pendant unit. The base application is configured to display the set of interactive graphical objects representing selectable applications on the graphical screen upon execution. The user selects one of the applications, for example, by pointing at the graphical object representing the application. Upon receiving the user selection, the processing component loads the selected application from the robot controller.

The invention claimed is:

1. A robot teach pendant unit coupled to a programmable robot controller, the teach pendant comprising;
   a graphical screen and a native user interface program configured to create a graphical user interface and to display the user interface on the graphical screen,
   a processing component configured to receive an application including one or more animated graphical objects, instructions for displaying the animated objects on the graphical screen, information on the behavior of the animated graphical objects and instructions on how the user can interact with the animated graphical objects,
   wherein the processing component is further configured to set up at least one sandbox for a received application, said sandbox providing an isolation mechanism for safely running the application without disturbing the execution of normal teach pendant operations,
   wherein the processing component is further configured to control user interaction and display of the animated graphical objects on the screen within the set up sandbox, and
   wherein said user interface program is configured to host the processing component and to instruct the processing component to load and display the application containing the animated graphical objects.

2. The robot teach pendant unit according to claim 1, wherein the processing component is further configured to load said application from the robot controller.

3. The robot teach pendant unit according to claim 2, wherein the processing component is further configured to load the application from an external computer over a communication network.

4. The robot teach pendant unit according to claim 1, wherein the processing component is further configured to receive a plurality of applications including one or more graphical objects, instructions for displaying the objects on the graphical screen, information on the behavior of the graphical objects, and instructions on how the user can interact with the graphical objects, and the processing component is configured to set up one sandbox for each application.

5. The robot teach pendant unit according to claim 1, wherein the processing component is further configured to load further graphical objects from the robot controller or from an external computer in response to a request from the application.

6. The robot teach pendant unit according to claim 1, wherein the processing component is further configured to load the application in a compressed format and the teach pendant unit provides the capability to uncompress the application.

7. The robot teach pendant unit according to claim 1, wherein the processing component is configured to handle vector graphics of the application.

8. The robot teach pendant unit according to claim 1, wherein the processing component is configured to load and execute a base application configured to display a set of interactive graphical objects representing selectable applications on the graphical screen, and upon receiving a user selection to load the selected application from the robot controller.

9. The robot teach pendant unit according to claim 1, further comprising;
   an operating system, and
   wherein the processing component is configured to automatically start execution of the base application upon start of the operating system of the teach pendant unit.

10. The robot teach pendant unit according to claim 1, wherein the native user interface program is not a web browser.

* * * * *